(12) United States Patent
Manning et al.

(10) Patent No.: US 7,377,700 B2
(45) Date of Patent: May 27, 2008

(54) FERRULE ASSEMBLY

(75) Inventors: Randy Manning, Lemoyne, PA (US);
Antonius Hultermans, Tilburg (NL);
Sjoerd Van Geffen, Veghel (NL);
David Baechtle, Dillsburg, PA (US)

(73) Assignee: Tyco Electronics Corporation, Middletown, PA (US)

( * ) Notice: Subject to any disclaimer, the term of this patent is extended or adjusted under 35 U.S.C. 154(b) by 0 days.

(21) Appl. No.: 10/514,268

(22) PCT Filed: May 2, 2003

(86) PCT No.: PCT/US03/13682

§ 371 (c)(1),
(2), (4) Date: Dec. 1, 2005

(87) PCT Pub. No.: WO03/093875

PCT Pub. Date: Nov. 13, 2003

(65) Prior Publication Data

US 2006/0147157 A1    Jul. 6, 2006

Related U.S. Application Data

(60) Provisional application No. 60/377,267, filed on May 2, 2002.

(51) Int. Cl.
*G02B 6/24* (2006.01)
*C03B 37/16* (2006.01)

(52) U.S. Cl. .............. 385/72; 385/60; 385/91; 65/433

(58) Field of Classification Search .......... 65/433; 385/60, 72, 91
See application file for complete search history.

(56) References Cited

U.S. PATENT DOCUMENTS

| | | | |
|---|---|---|---|
| 4,850,664 A | 7/1989 | Iri et al. | 350/96.2 |
| 5,394,497 A | 2/1995 | Erdman et al. | 385/78 |
| 5,743,785 A | 4/1998 | Lundberg et al. | 451/28 |
| 5,943,460 A | 8/1999 | Mead et al. | 385/81 |
| 5,966,485 A | 10/1999 | Luther et al. | 385/85 |
| 6,196,732 B1 * | 3/2001 | Tamekuni et al. | 385/78 |
| 6,200,040 B1 | 3/2001 | Edwards et al. | 385/78 |
| 6,246,026 B1 | 6/2001 | Vergeest | 219/121.72 |
| 6,282,349 B1 * | 8/2001 | Griffin | 385/81 |
| 6,331,081 B1 | 12/2001 | Ohtsuka et al. | 385/85 |
| 6,963,687 B2 | 11/2005 | Vergeest et al. | 385/123 |
| 2002/0076174 A1 * | 6/2002 | Toyama | 385/93 |
| 2003/0031450 A1 * | 2/2003 | Maher et al. | 385/137 |
| 2003/0142922 A1 * | 7/2003 | Dallas et al. | 385/83 |
| 2004/0047587 A1 * | 3/2004 | Osborne | 385/147 |

FOREIGN PATENT DOCUMENTS

| | | | | |
|---|---|---|---|---|
| EP | 0860 722 A | 8/1998 | | 6/38 |
| GB | 2 356 066 A | 5/2001 | | 6/42 |

OTHER PUBLICATIONS

Supplementary Search Report from corresponding European Patent Application No. EP 03 72 4387.

* cited by examiner

*Primary Examiner*—Michelle Connelly-Cushwa
*Assistant Examiner*—Jerry T. Rahll

(57) ABSTRACT

A process for preparing terminated fibers comprising: (a) positioning at least one fiber in a ferrule such that a portion of the fiber extends beyond the mating face of the ferrule; (b) affixing the fiber relative to the ferrule; and (c) cleaving the portion of the fiber.

23 Claims, 7 Drawing Sheets

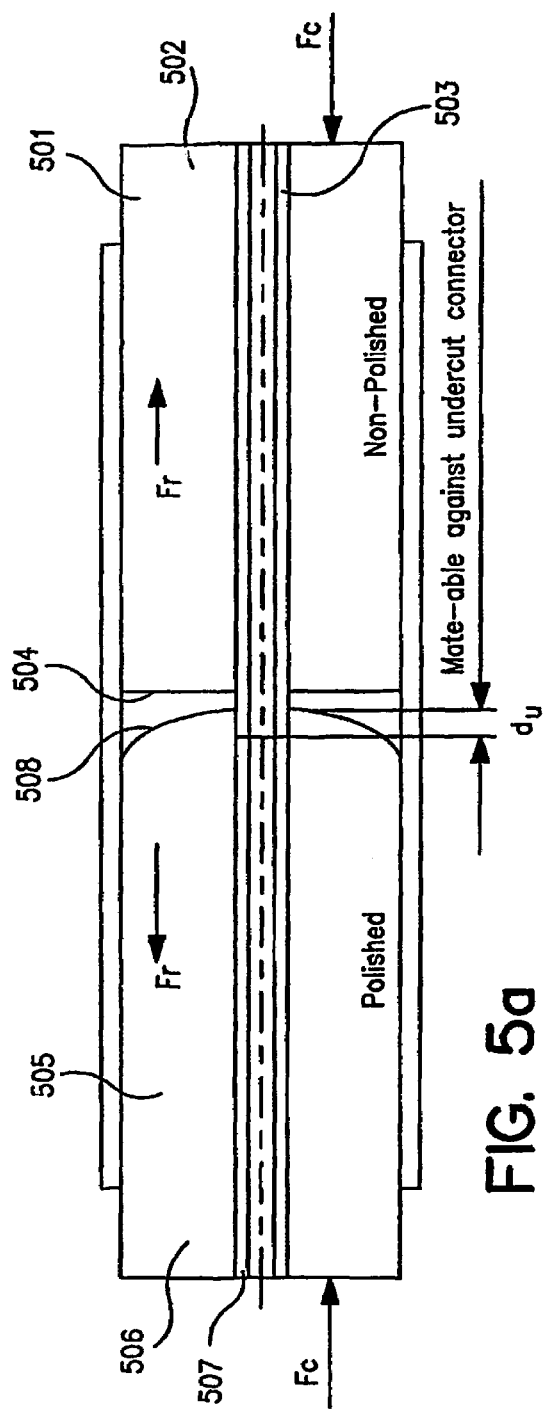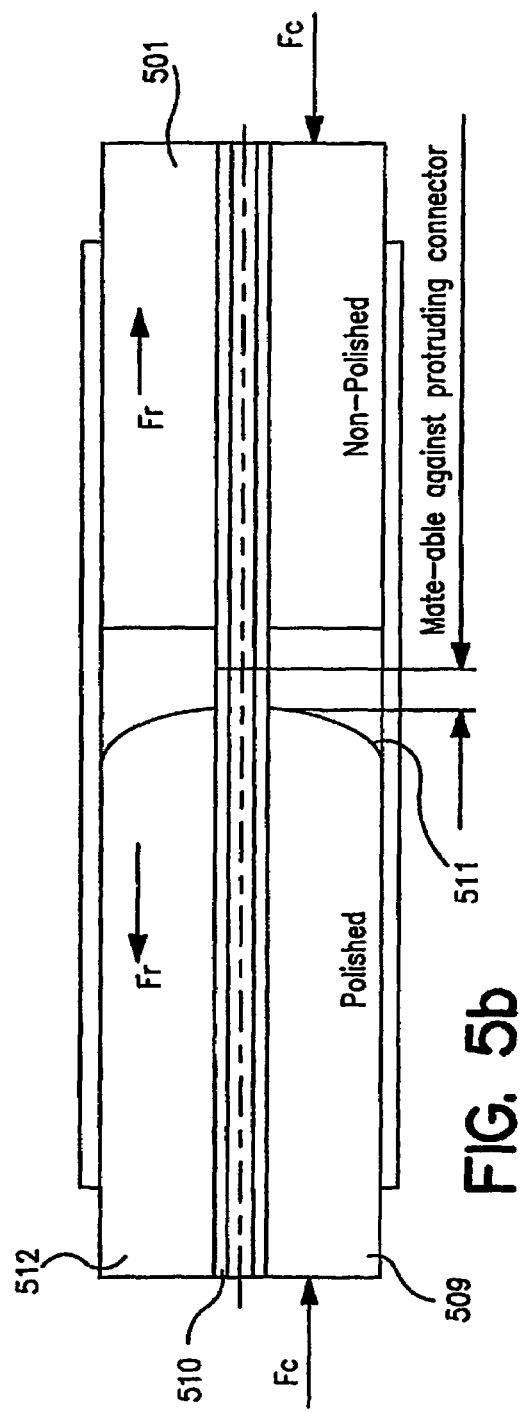

FERRULE ASSEMBLY

REFERENCE TO RELATED APPLICATION

This application claims priority to U.S. Provisional Application No. 60/377,267, filed May 2, 2002 and hereby incorporated by reference.

FIELD OF INVENTION

The present invention relates generally to an optical component, and, more specifically, to a ferrule-containing optical connector.

BACKGROUND OF INVENTION

Optical fiber connectors are an essential part of substantially all optical fiber communication systems. For instance, optical connectors are used to join segments of fiber into longer lengths, to connect fiber to active devices such as radiation sources, detectors and repeaters, and to connect fiber to passive devices such as switches and attenuators. The principal function of an optical fiber connector is to hold a fiber end such that the core of the fiber is axially aligned with the optical path of the component to which the connector is mated (e.g., another fiber, a planar waveguide, or an opto-electric device). This way, light from the fiber is optically coupled to the other component.

It is well known that to effect optical coupling and minimize Fresnel loss, "physical contact" should be made between the fiber end and the optical path of the mating device. To effect physical contact, traditionally optical connectors have employed a "ferrule," which is a well-known component for holding one or more fibers such that the fiber ends are presented for optical coupling. Ferrule connectors typically bias the ferrule forward such that, when the connector is mated to a mating component, a mating face of the ferrule urges against the mating component to physically contact the fiber end face with the optical path of the mating component.

To effect such physical contact, a conventional ferrule typically requires polishing. A polished ferrule may best be described by way of contrast to an unpolished ferrule. An unpolished ferrule has a geometry and anomalies on its mating face which make it difficult, if not impossible, to bring the end face of fiber housed therein into physical contact with the optical path of the mating component. In addition, when multiple fibers are affixed to an unpolished ferrule, the positions of the fiber ends tend to vary along the mating axis, thereby making it difficult to effect optical coupling with all of the fibers. Polishing the mating face of the ferrule tends to minimize these variances and shape the mating face of the ferrule to present the fiber ends in an even plane for mating.

Unfortunately, to minimize the variances and shape the ferrule, polishing must be performed to exacting standards. Polishing therefore tends to be costly and prone to reworking and waste, thereby lowering yields. The problems associated with polishing the ferrule are exasperated in multi-fiber ferrules which are more complicated to polish.

Therefore, there is a need for optically coupling a fiber-containing ferrule to an optical path of a mating component without polishing the ferrule. The present invention fulfills this need among others.

SUMMARY OF INVENTION

The present invention provides for a ferrule assembly that overcomes the aforementioned problems and offers enhanced configurability. Specifically, the applicants have developed an approach for terminating a fiber in a ferrule which separates the functions of preparing the fiber's end face for optical coupling and positioning the fiber within the ferrule. This is a departure from conventional approaches in which the two functions are performed in a single polishing step. By treating the functions individually, the fiber end face can be prepared independent of the ferrule, thereby eliminating the need to polish the ferrule/fiber assembly. Generally, it is preferred that the fiber be cleaved after it is disposed in the ferrule to minimize handling of the fiber end face which can blemish or otherwise optically degrade the end face. Furthermore, since the ferrule assembly is not subject to polishing, the axial position of the end face relative to the ferrule can be addressed independently from its preparation. This facilitates precise axial positioning of the fiber end face relative to the ferrule. Generally, it is preferred to have the fiber end face protrude from the ferrule to enhance its ability to make physical contact for optical coupling.

One aspect of invention is a process of preparing a ferrule assembly without polishing the ferrule. In a preferred embodiment, the process comprises: (a) positioning at least one fiber in a ferrule such that a portion of the fiber extends beyond the end face of the ferrule; (b) affixing the fiber relative to the ferrule; and (c) cleaving the portion of the fiber. Preferably, the cleaving is effected by laser cleaving.

Another aspect of the invention is a ferrule assembly made from the process described above. In a preferred embodiment, the ferrule assembly comprises: (a) an unpolished ferrule defining one or more pathways, each pathway being adapted to receive a fiber, and a mating face; and (b) a fiber in each pathway, each fiber having an end face which is suitable for optical coupling. Preferably, the fiber protrudes from the mating face.

Yet another aspect of the invention is an optical package having a ferrule assembly with an unpolished ferrule. In a preferred embodiment, the optical package comprises: (a) a housing; (b) a ferrule assembly disposed at least partially in the housing, the ferrule assembly comprising at least (i) an unpolished ferrule defining one or more pathways, each pathway being adapted to receive a fiber, and a mating face; and (ii) a fiber in each pathway, each fiber having an end face which is suitable for optical coupling. Preferably, the optical package is a connector.

Another aspect of the invention is an optical package having a ferrule assembly with an unpolished ferrule in which the fiber end is shaped and the end face of the ferrule is normal to the fiber. In a preferred embodiment, the optical package comprises: (a) a housing having a register surface; (b) a ferrule assembly disposed at least partially in the housing, the ferrule assembly comprising at least (i) an unpolished ferrule defining one or more pathways, each pathway being adapted to receive a fiber, and a mating face normal to the pathways and abutting the register surface of the housing; and (ii) a fiber in each pathway, each fiber having a shaped end face which is suitable for optical coupling. Preferably, the optical package is an expanded beam connector.

Still another aspect of the present invention is a system of connectors and other optical packages which employ ferrule assemblies having unpolished ferrules which can mate with other ferrule assemblies having either polished or unpolished ferrules.

BRIEF DESCRIPTION OF DRAWINGS

FIGS. 5a and 5b show the mating of a ferrule assembly of the present invention with polished ferrules having undercut and protruding fibers, respectively.

DETAILED DESCRIPTION

Figure 1:
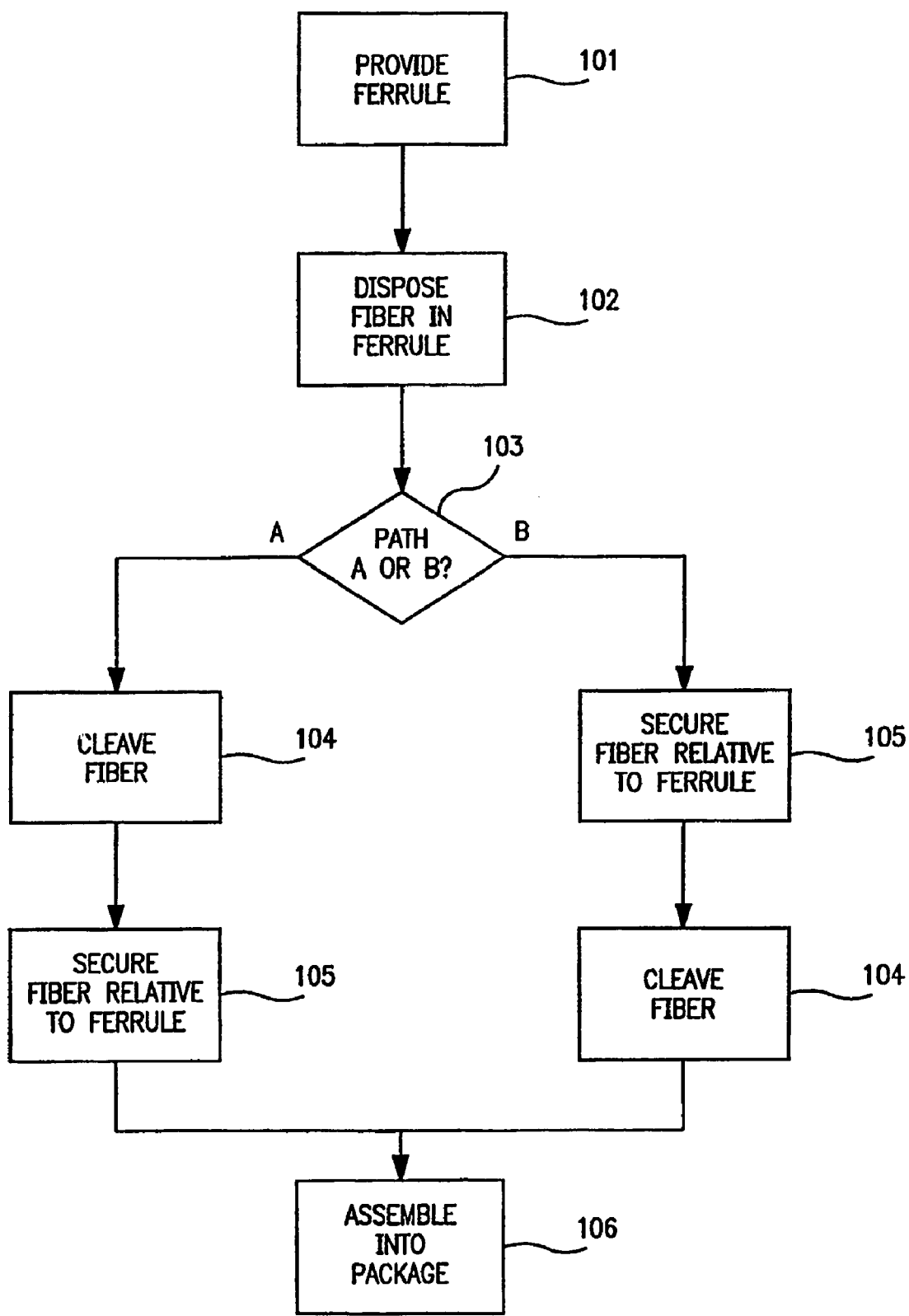
FIG. 1 is a flow chart of a preferred process of the present invention.

Referring to FIG. 1, a flow chart 100 depicting an overview of a preferred method of the present invention is shown. In step 101, a ferrule for an optical connector is provided. The ferrule has one or more pathways to receive fibers therein. In step 102, one or more fibers are positioned in the pathways of the ferrule such that a portion of each fiber extends beyond the end face of the ferrule. At this point, a decision block 103 is reached in which the process of the present invention follows a path A or path B. If path A is followed, the process proceeds to step 104 in which the fibers are cleaved. Cleaving the fibers can be performed using any traditional technique, although laser cleaving is preferred. Once cleaved, the process proceeds to step 105, in which the position of the fibers relative to the ferrule is secured, thereby forming the ferrule assembly. As used herein, the term "ferrule assembly" refers to a ferrule having one or more fibers terminated in it. At this point, the process proceeds to step 106, in which the ferrule assembly is incorporated into an optical package which may be, for example, a connector or other ferrule-containing device. Referring back to decision block 103, if path B is followed, the process proceeds first to step 105 (rather than step 104), in which the position of the fibers with respect to the ferrule is secured. Next, in step 104, the fibers are cleaved, thereby completing the ferrule assembly. Again, the process concludes with the assembly of the ferrule assembly into the connector or ferrule-containing device in step 106. Each of these steps is discussed in greater detail below.

Step 101 involves providing at least one ferrule. The ferrule comprises one or more pathways, each pathway being adapted to receive a fiber, and a mating face, which, in the final ferrule assembly, presents each fiber end for optical coupling to an optical pathway of a mating component. The pathways may be, for example, bore holes or V-grooves. Such ferrules are well-known in the art and include for example, MT-style ferrules (such as those used in the MT-RJ and Lightray MPX7 ferrules), SC-style ferrules, and LC- and MU-style ferrules.

Generally, ferrules are made of ceramic or polymeric material. Such materials are suitable if the process of the present invention follows path A, wherein cleaving is performed prior to affixing the fibers relative to the ferrule. That is, if the fibers are cleaved before they are affixed to the ferrule, they can be extended well past the mating face of the ferrule such that the cleaving operation does not interfere with the ferrule or vice versa. However, if the process follows path B, and cleaving occurs after the fibers are affixed to the ferrule, it is unlikely that the cleaving process can be isolated from the ferrule to the extent that there will not be some interference therebetween. This interference may preempt the use of mechanical-type cleaving due to the physical interference between the mating face of the ferrule and the cleaving mechanism. Thus, in such a situation, laser cleaving may be the only viable cleaving alternative.

Laser cleaving, however, tends to impart a great deal of heat in the vicinity of the cleave, which in a preferred embodiment may be less than a half a millimeter from the ferrule. At a typical distance of less than 0.5 millimeters from the end face of the ferrule, and using a typical $CO_2$-type laser, one can expect the temperature at the ferrule end face to approach that required to ablate optical fiber. Such temperatures are problematic for conventional polymeric materials such as, e.g. PPS, which is used in MT-type ferrules. Specifically, polymeric materials tend to degrade, melt or deform at such temperatures, thereby compromising the physical integrity of the ferrule and distorting it beyond typical allowable tolerances. Furthermore, ceramic materials typically used in ferrules are prone to cracking at such temperatures.

Due to the proximity of the laser to the ferrule end face in path A, it is preferable for the material at the mating face of the ferrule (herein "mating face material") to either (a) reflect energy, or (b) absorb the laser energy without damaging the ferrule or the fibers contained therein. With respect to reflecting the laser energy, suitable materials preferably reflect at least 90% of the laser light. Since the reflectivity of a material is dependent on the wavelength of the beam, the choice of mating face material will depend on the type of laser used. For example, copper is well suited for a $CO_2$ laser. With respect to absorbing the laser energy without deformation or degradation, suitable materials have a heat capacity greater than water. Examples of suitable materials include, for example, high temperature ceramics which are well known.

In the embodiment in which a reflective material is used to reflect laser energy, just the end face may comprise such a material, although it may be preferable to form the entire ferrule of such a material from a simplicity standpoint. Likewise, in the embodiment in which an energy-absorbing material is used, the material may be used just at the mating face (providing that an adequate mass of material is present to absorb and dissipate the heat) or the entire ferrule may be made from such a material.

As mentioned above, a conventional ferrule end face is typically polished to remove all anomalies therefrom and to present the fiber ends for coupling. However, the ferrule of the present invention does not require such polishing since the fiber ends are polished during the cleaving step 103. Therefore, in a preferred embodiment, the ferrule is unpolished. As used herein, the term "unpolished ferrule" refers to a ferrule has not been polished or is not polished to the extent typically required to achieve physical contact.

An unpolished ferrule in this context has a number of distinguishing characteristics. First, an unpolished ferrule typically has surface anomalies on its end face which tend to interfere with the mating surface of the mating connector or device and prevent end faces of fibers from making physical contact with mating optical pathways. For example, ridges or bumps on the mating face of an unpolished ferrule prevent the mating face from making good physical contact with a perfectly planar surface. Those skilled in the art will understand that these surface anomalies tend to make physical contact in the center of the mating face most difficult, which is particularly problematic since the center of the ferrule is typically where the fibers are located. Obviously, as the mating face of the ferrule becomes larger in area, as with MT ferrules, the probability of surface variations and imperfections increases along with the number of fibers requiring physical contact. Polishing the ferrule removes these surface anomalies. Generally, for an MT connector, the surface irregularities are removed during polishing such that the maximum gap between the mating face of the ferrule and a perfectly flat plane is less than about 0.25 µm By contrast, an unpolished ferrule may have a gap between its mating face and a perfectly flat plane of greater than about 2.5 µm Another approach for mitigating the effects of surface anomalies on the mating face is to polish a dome on the mating face such that the fibers are located at the apex of the dome. This guarantees that the end faces of the fibers are on the leading surface on the mating face along the mating axis, and, thus, any anomalies toward the edges of the ferrule will not prevent the fibers from contacting the mating surface. Obviously, an unpolished ferrule has no dome.

Polishing the ferrule is also required to cause the fiber end faces to protrude a certain distance from the ferrule's mating face. This is due to the fact that MT ferrules typically comprise a polymer material which tends to abrade more quickly than the fibers during polishing. As the ferrule material abrades around the fibers, the fibers effectively protrude from the mating face. Such a protrusion increases the likelihood of the fiber end faces making physical contact with the mating optical pathway of a mating structure. According to U.S. Pat. No. 5,743,785, in a polished ferrule, the ends of the fiber should protrude from the ferrule's mating face by about 0.5 to about 2.5 µm, or, in other terms, from about 0.4 to about 2% of the fiber's diameter. Therefore, with an unpolished ferrule, the fiber protrudes by less than 0.5 µm or by greater than 2.5 µm from the ferrule's mating face, or by less than 0.4% or by greater than 2% of the fiber's diameter.

Therefore, as used herein, the term "unpolished ferrule" refers to a ferrule having one or more of the following features: (1) a gap of greater than about 2.5 µm between the mating face of the ferrule and a perfectly planar surface, (2) a mating face which is not domed, and (3) a fiber protrusion of less than 0.5 µm or greater than 2.5 µm from the ferrule's mating face, or less than 0.4% or greater than 2% of the fiber's diameter. In samples of 100 or more connectors of the present invention, at least 90% have one or more of these characteristics and at least 70% have two or more of these features.

Step 102 involves disposing a fiber in each pathway of the ferrule such that a portion of the fiber extends beyond the end face of the ferrule. Each fiber is positioned such that a sufficient portion extends beyond the end face of the ferrule to facilitate cleaving thereof. The extent to which a fiber extends from the ferrule will depend upon the cleaving techniques used. For example, a mechanical type cleaving method typically required more space than a laser cleaving approach and thus the fiber needs to extend further beyond the ferrule mating face to accommodate the mechanism One skilled in the art will readily understand to what extent the fibers should be extended past the mating face of the ferrule to facilitate cleaving thereof.

Step 104 involves cleaving the fiber. The fiber is cleaved to produce an end face which is suitable for optical coupling. As used herein, an end face that is suitable for optical coupling is one in which has no optical or mechanical defects (e.g. no change in refractive index, no scratches or chips, etc.).

Cleaving the fibers may be performed either mechanically or by laser cleaving. With respect to mechanical cleaving, this is a well-known technique and involves essentially shearing the fibers cleanly to provide a mating face. It may be preferred to polish a mechanically cleaved end face of the fiber. Methods of performing this polishing are well-known and may include, for example, physical grinding/polishing and "laser polishing" in which a laser is used to melt and thereby smooth the end face of the fiber. Although mechanical cleaving is certainly contemplated in the present invention, the preferred method of cleaving is laser cleaving.

A preferred process for laser cleaving is described in U.S. Pat. No. 6,246,026, incorporated herein by reference, and pending U.S. application Ser. No. 09/880,698, also incorporated herein by reference.

In the laser cleaving process, optical fiber material is ablated rather than melted. This requires the laser to impart sufficient energy into the fiber to effect its immediate sublimation In general, any laser with a wavelength between 0.1 and 1.5 µm and 8.5 µm to 10 µm can be used for producing the beam for cleaving the fibers. Suitable lasers include, for example, $CO_2$ and excimer lasers, although a $CO_2$ laser is preferred. $CO_2$ lasers have proven particularly advantageous due to the high speed at which they can be operated and resulting cost effectiveness.

Balancing the objective of delivering high energy to fiber to ablate the glass is the need to minimize the energy absorbed by the glass surrounding the cut so as to minimize melting adjacent the cut. For this reason, the laser is preferably operated in a pulse mode for cutting the fiber. In the pulse mode, the laser transmits short high-energy pulses of laser light so that the material of the fiber is sublimated. The pulses are very short and have very steep edges, thus, the maximum pulse energy is achieved very rapidly. For example, suitable results have been achieved in which the peak power of the pulse is between about 0.1 and about 1000 watts and the pulse length is greater than about 50 fs. Very good results are achieved with a $CO_2$ laser (wavelength 10.6 µ) having a pulse length of 35 µs and a peak power of 600 watts.

Although operating the laser in pulse mode is preferred generally, particularly with high power lasers such as a $CO_2$ laser, some application may favor operating the laser in a continuous wave mode. For example, if the contact time between the laser and fiber is decreased, i.e., the laser cuts across the fiber more quickly, it may be desirable to operate the laser in continuous wave mode.

Directing the laser beam on the fiber to effect the cut is subject to several variables involving the angle of the beam to the fiber and the axial position of the beam along the fiber. The angle of the beam is defined by two angles α and θ which are defined with respect to the Cartesian coordinate system in which the optical axis of the fiber is along the z axis and the y and z axes are perpendicular to each other and the z axis. Angle α corresponds to the angle of the beam from the y axis, while angle θ corresponds to the angle of the beam from the x axis. For purposes of illustration, the x axis will be considered the horizontal axis and the y axis will be considered the vertical axis unless otherwise stated. It should be understood, however, that this orientation is arbitrary and by no means limits the scope of the invention Before addressing the particular angles θ and α, an understanding of the geometry of the laser beam and its cutting tendencies through fiber is worthwhile. In a preferred configuration, laser cleaving is performed using a combination of a laser and a convergent lens. This combination produces a beam having an angle of convergence of β from the centerline of the beam. Since the beam is converging and not collimated, its angle of incidence with the fiber is not simply parallel to the beam's centerline. Rather, the beam's perimeter contacts the fiber at an angle β relative to its centerline. In other words, the laser beam can be visualized as a conical beam that contacts the fiber substantially along the perimeter of the cone. Furthermore, the beam's effect on the fiber is not limited to just the area defined by the beam. Heat from the beam extends past the beam and ablates fiber material adjacent to it. The degree to which the adjacent fiber material is affected is a function of the time it is exposed to the beam—the longer the exposure the more material is ablated. Therefore, rather than cutting the fiber along the centerline of the beam, the fiber will be cut along a line which greater than angle β from the beam's center line.

Figure 2A:
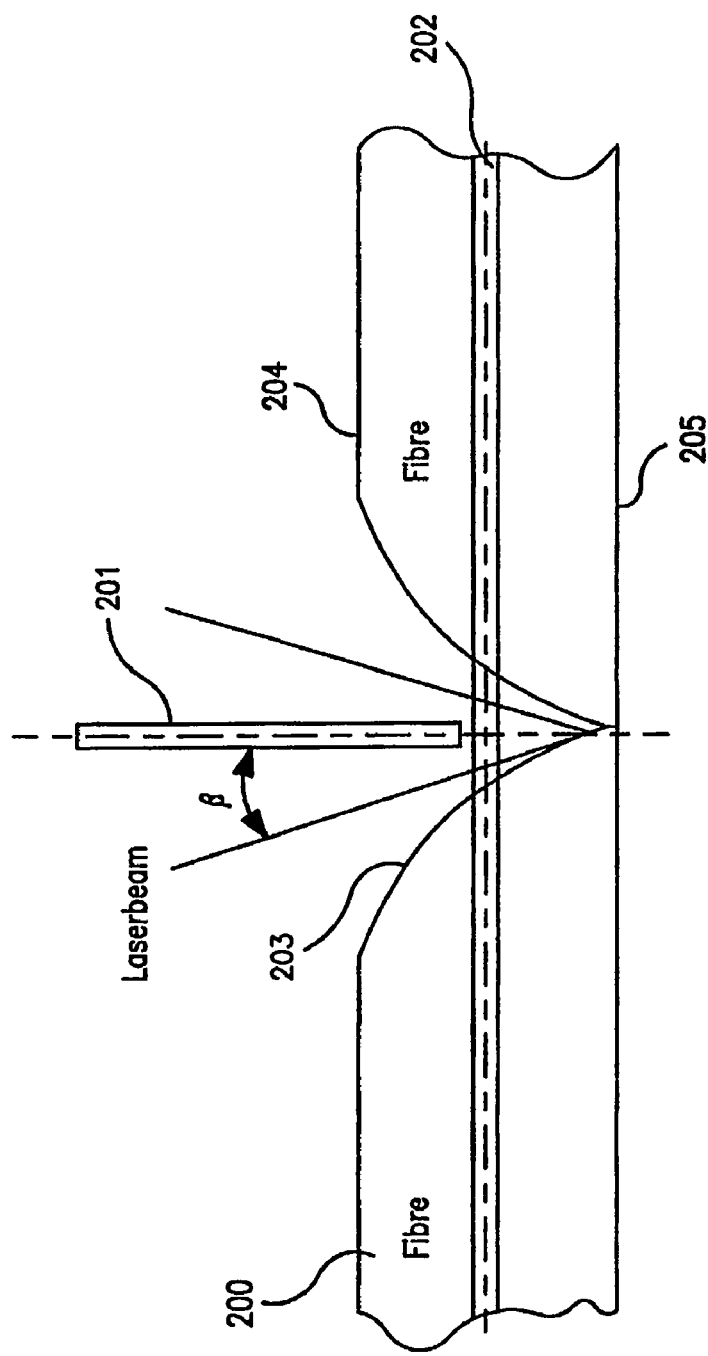
FIG. 2a shows the effect of a converging laser beam on a fiber during cutting when the beam is held perpendicular to the fiber.
Figure 2B:
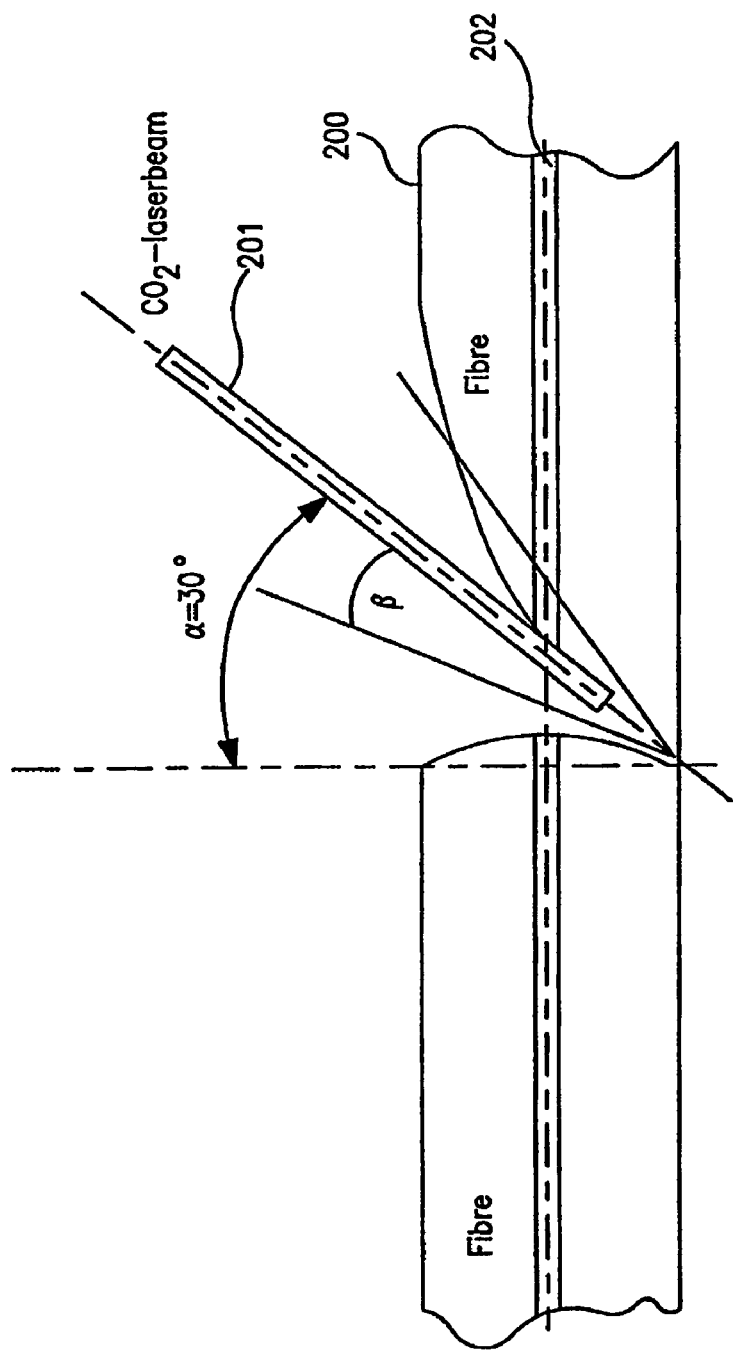
FIG. 2b shows the effect of the same beam as in FIG. 2a but at angle α from the fiber.

For example, referring to FIG. 2a, a schematic is shown of a beam 201 having an angle β of convergence and an angle α of zero. Rather than cutting an end face essentially normal to the optical axis 202 of the fiber 200, such a configuration results in an end face 203 having a parabolic profile, which is generally undesirable. More specifically, as the laser cuts from top to bottom, the top 204 of the fiber is subjected to the beam for a longer time than the bottom 205. Additionally, since the beam is converging the beam at the top of the fiber will be wider than at the bottom of the fiber. The combination of longer exposure time and a wider beam results in the aforementioned parabolic profile.

To avoid a parabolic profile, the laser must be directed at the fiber at an angle a as shown in FIG. 2a. The angle α depends upon the angle of convergence and the cutting time/energy level of the beam For example, to prepare an essentially normal end face 206, angle α should be about 30° for a $CO_2$ laser having a peak energy level of about 600 watts.

Figure 3A:
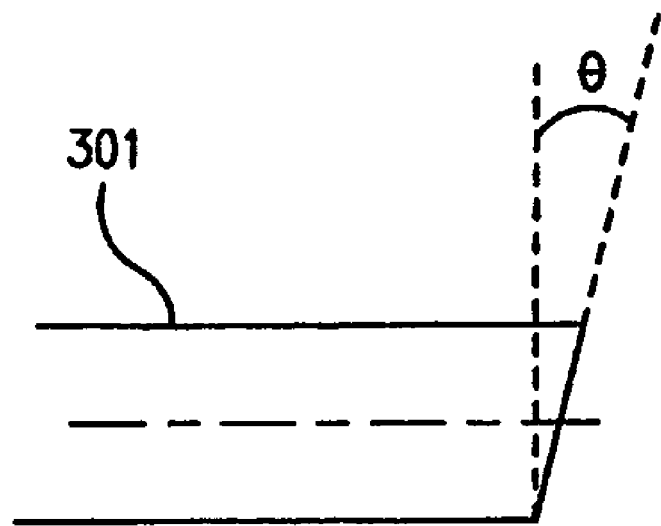
FIGS. 3a and 3b show top views of different end face geometries formed through laser cleaving.
Figure 3B:
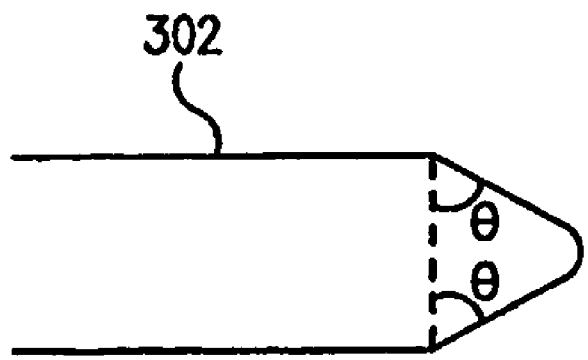

The angle θ is variable and depends upon the desired end face geometry. For example, if a planar end face which is essentially normal to the optical axis of the fiber is desired, then angle θ will be about 0. Often it is preferred to bevel the end face of the fiber, particularly in single mode applications in which it is desirable to minimize back reflection To this end, a common angle θ for single mode fiber end faces is about 8° as shown in FIG. 3a which is a schematic top view of a fiber 301. Aside from planar or nearly planar end faces, the laser cleaving approach of the present invention can provide for multifaceted or curved end faces. For example, in a preferred embodiment, laser cleaving can be used to form a wedged-shaped fiber end as shown in FIG. 3b which is a schematic top view of a fiber 302. Such a configuration is well suited for optically coupling the fiber with pump-type lasers or other devices which emit or receive an elliptical beam of light.

Generally, it is preferred that the beam impinge on the portion of the fiber that extends a distance $d_o$ from the mating face of the ferrule. As used herein, the term "distance $d_o$" refers to the shortest distance between the mating face of the ferrule and the end face of the fiber formed after cleaving. It should be understood that distance $d_o$ is not defined by the distance between the mating face of the ferrule and the centerline of the beam since the beam does not cut along its centerline as discussed above. The distance $d_o$ can vary depending upon the cleaving technique. The distance $d_o$ is not as critical with path B, since the fiber's axial position with respect to the mating face of the ferrule can be adjusted after cutting. On the other hand, with path A, in which the fibers are fixed and then cleaved, the distance $d_o$ is critical since it is the distance between the end face of the fiber and the mating face in the final fiber assembly (herein "distance $d_f$"). There is no opportunity in path A to readjust the fiber's position with respect to the ferrule's end face after it has been cut.

Figure 4A:
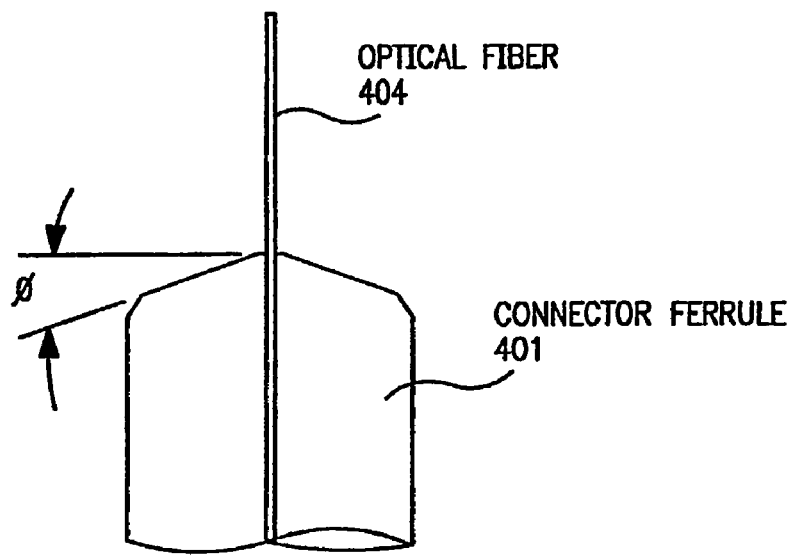
FIGS. 4a and 4b show a preferred approach for laser cleaving when the distance between the ferrule mating face and the fiber end face is small.
Figure 4B:
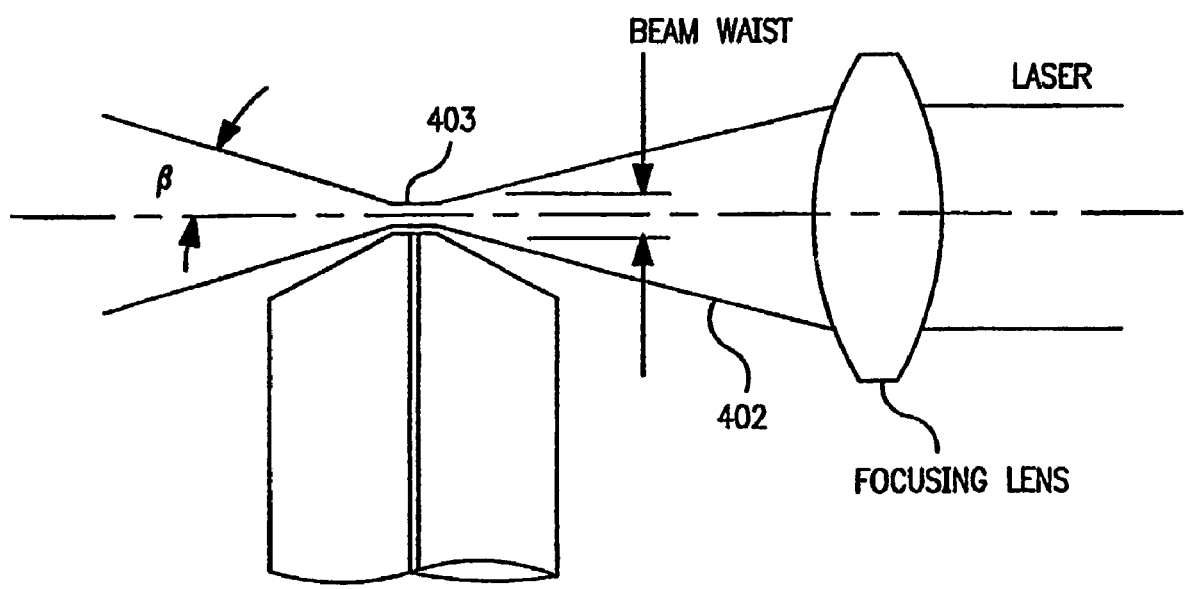

It has been found that for a particularly small distance $d_o$ the mating face of the ferrule will interfere with the laser beam. This interference can result in a distortion of the laser beam which can affect the accuracy of the laser cut. Additionally, this interference may result in a greater than desired absorption of energy by the ferrule which may cause it to distort or degrade. Accordingly, in the case of small distance $d_o$, it may be preferred to use a cleaving configuration as shown in FIGS. 4a and 4b to avoid this interference. As shown in FIG. 4a, a ferrule 401 has a domed or beveled mating face 401 which is angled away from the fiber 404 at an angle φ. The beam 402 has a convergence angle β. It is well known that a converging beam will meet and then diverge. In this configuration, the beam is positioned such that cleaving is performed at about the point of convergence or at the waist 403 of the beam If φ is equal to or greater than β and the beam is substantially perpendicular to the fiber, then the beam should avoid the mating face of the ferrule. If the beam is not substantially perpendicular to the fiber, but instead at angle α to the fiber (as is preferred), then the angle φ needs to be equal to or greater than α+β.

The way in which the fibers and laser beam are moved relative to each other to effect the cuts described above can vary and it is anticipated that any approach which is precise, accurate and repeatable will suffice. In a preferred embodiment, a device is used which maintains angle α between the beam and the fiber and moves the fiber at one or more predetermined angles θ relative to the laser beam. It is within the scope of the present invention, however, to move the laser beam relative to the fiber.

The laser cleaving process has a number of advantages over traditional mechanical cleaving approaches. Perhaps the most significant advantage is that laser cleaving produces a very smooth fiber end face so additional machining of the fiber end after cutting—as is normal with mechanical cutting processes—is no longer necessary. Elimination of polishing is very significant. Not only is polishing a difficult and time-consuming task, which is prone to error (and therefore waste), but it also affects the axial position of the fiber end face. That is, polishing grinds or otherwise alters the physical features of the end face and thereby affects the axial position of the fiber end. This effect can be critical in the case of a multi-fiber array (e.g., ribbon cable) in which variation in axial position of the various fibers cannot be tolerated. More specifically, if the end faces are at different axial positions, they are prevented from simultaneously making physical contact with optical paths of the mating component. According to U.S. Pat. No. 5,743,785, for an MT ferrule, the end face variation or "delta" among the fibers along the mating axis should be not greater than about 0.4 □m and preferably not greater than about 0.2 μm. Axial positioning of the end faces is also critical if path B is chosen and the fiber is secured relative to the ferrule before cutting. Because a laser-cleaved fiber does not need to be polished, the axial position of its end face is not subject to this variation. Laser cleaving typically cleaves the end face with an axial position accuracy of 0.1 μm. Therefore, in an unpolished MT ferrule, the end face delta will typically be no greater than about 0.4 μm, and preferably no greater than about 0.2 μm.

In step 105, the fibers are affixed such that their relative position with respect to the ferrule is fixed. Methods of fixing the fibers positioned relative to the ferrules are well-known and include, for example, applying epoxy to the ferrule pathways. Other techniques for fixing the fibers position may include, for example, clamping the fiber in an object which is in fixed relation to the ferrule (see, for example, U.S. Pat. No. 6,200,040 which discloses such a claiming mechanism, i.e., the slice element).

In path A, where the fiber's position is fixed relative to the ferrule after the fibers are cut, the fiber is moved such that its end face is distance $d_f$ from the mating face of the ferrule. Thus, in the situation where the fiber is cleaved a distance $d_o$ from the mating face of the ferrule, in step 104, that distance is decreased to $d_f$.

In one embodiment, the mating face of the ferrule is pushed flush against the flat surface so that the distance $d_f$ is equal to 0. Alternatively, it may be preferred to allow the fiber to protrude somewhat from the mating face of the ferrule such that distance $d_f$ is greater than 0. For example, as discussed in detail below, it is recognized that a fiber that protrudes from the mating face of the ferrule is often more likely to make physical contact with the optical path of the mating component. That is, if the fiber protrudes from the mating face, then any anomalies on the mating face which might otherwise prevent the mating face from forming intimate contact with the mating face of the mating component. A protruding fiber does not require such intimate contact between mating faces. Thus, there is no need to deform the ferrule as is often necessary in conventional type physical contact connectors.

Aside from avoiding problems associated with forming intimate contact with the mating surface of the ferrule and deforming the ferrule, a protruding fiber also enables physical contact to be made with a mating connector in which the fiber is undercut from the ferrule. That is, it is not uncommon during the polishing process for the end face of the fiber to recede within the ferrule such that the mating face of the ferrule extends beyond the end face of the fiber. Clearly, in such a situation, physical contact with the end face of the fiber is made difficult. However, a fiber that protrudes from the mating face of the ferrule is able to extend into the ferrule of the mating component and make contact with the end face of the fiber contained therein.

The ferrule assembly of the present invention is uniquely suited to facilitate fiber protrusion since the fiber end and ferrule mating face are not polished simultaneously as in the prior art. Polishing a ferrule and fiber assembly together results generally in a fiber end face which is flush with the ferrule mating face. The approach of the present invention polishes the fiber end independent from the ferrule (in fact, preferably, the ferrule is not even polished). Thus, the fiber end position with respect to the ferrule end face is fully configurable.

Countering the desire for the fiber to protrude from the mating face of the ferrule, is the recognition that fibers tend to be delicate and subject to damage. The possibility for damage or breakage increases as the fiber length protruding from the mating face of the ferrule increases. Accordingly, it has been found that preferred distances $d_f$ are from about 0 to about 20 μm, and more preferably from about 1 μm to about 5 μm.

Positioning the fiber a distance $d_f$ from the mating face of the ferrule can be accomplished in different ways. If distance $d_f$ is about 0, a preferred way to position the fiber is to press the mating face of the ferrule with the fiber protruding therefrom against a flat surface to thereby push the fiber backward relative to the ferrule until it is flush with the mating face of the ferrule. More complicated position approaches are required if the distance $d_f$ is greater than 0. Suitable approaches include, for example, pushing the ferrule to a flat under a small angle or use translation stages, or any other way of moving the fiber while measuring the fiber end face position.

In step 106, the ferrule assembly having the fibers cleaved and affixed relative thereto is assembled into an optical package. As used herein, the term "optical package" refers broadly to an assembly comprising a fiber-terminated ferrule assembly and may include, for example, a ferrule-containing connector (e.g., multi-fiber connectors such as the Lightray MPX7 connector, MT-RJ connector, and MTP connector, and single-fiber connectors such as the SC-, FC-, LC-, and MU-type connectors), or a ferrule-containing device (e.g., passive devices, such as, add/drop filters, arrayed wave guide gratings (AWGs), splitters/couplers, and attenuators, and active devices, such as, optical amplifiers, transmitters, receivers and transceivers). As is well known, the ferrule assembly in the optical package holds a fiber end such that the core of the fiber is axially aligned with the optical path of the mating component to which the connector or device is mated. This way, light from the fiber is optically coupled to the other component. The term "optical pathway" as used herein refers to any medium for conducting optical signals, and includes, for example, a fiber or waveguide, a silica or polymeric structure in a substrate, or a silica or polymeric optical component. The term "mating component" refers to an optical package that contains or comprises the optical pathway, and may include, for example, optical connectors and optical devices as mentioned above. A mating component typically comprises a mating surface which is adapted to receive the mating face of the ferrule to optically couple the fiber(s) with the mating optical pathway(s). Such mating surfaces are well known in the art.

Optical packages comprising the ferrule assembly of the present invention have a number of advantages over traditional ferrule-containing packages. First, as mentioned above, the ferrule assembly of the present invention obviates the need for polishing. This results in significant simplification of the assembly process and a significant reduction in costs. Aside from this advantage, however, the package of the present invention also has performance related advantages over traditional connectors and packages.

Perhaps the most significant performance advantage is derived from the configurability of the fiber's protrusion from the ferrule mating face. The protrusion not only allows for the use of an unpolished ferrule but also facilitates mating with an unpolished ferrule. Thus, the ferrule assembly of the present invention does away with the need for polished ferrules entirely, thereby reducing costs among various optical packages. Furthermore, the fiber's protrusion can even be exploited to compensate for uncut of a polished or unpolished ferrule.

FIGS. 5*a* and 5*b* are schematic views of the ferrule assembly of the present invention optically coupling with a polished ferrule having an uncut and a protrusion, respectively. Referring to FIGS. 5*a* and 5*b*, the ferrule assembly 501 of the present invention is shown comprising a ferrule 502 and a fiber 503 disposed therein which protrudes from the mating face 504 of the ferrule 502. In FIG. 5*a*, the ferrule assembly 501 is shown making physical contact with a polished ferrule assembly 505 of a mating component. Like the ferrule assembly of the present invention, ferrule assembly 505 has a ferrule 506 and a fiber 507 disposed therein. However, unlike the ferrule assembly of the present invention, fiber 507 does not protrude from the ferrule, but rather is undercut a distance $d_u$ from the mating surface 508 of the ferrule. Although distance $d_u$ is best minimized and preferably zero, the ferrule assembly of the present invention nevertheless can optically couple with mating ferrule assemblies having $d_u$ from 0 to about 0.5 mm. Referring to FIG. 5b, the ferrule assembly 501 is shown mating with a ferrule assembly 509 in which a fiber 510 protrudes from the mating surface 511 of a polished ferrule 512.

In addition to the connector of the present invention being more tolerant of variations in the mating components, it also does not require the same degree of mating force as does a traditional connector. It is well known that to effect physical contact of conventional ferrule-containing connectors, the ferrules must be biased forward such that when mated the ferrules urge against each other. This force is needed to deform the ferrules and ensure physical contact between the fibers therein. The force with which a ferrule contacts a mating ferrule is referred to as the mating force which is significant. The mating force imparted by connectors becomes problematic as the number of connectors on a given substrate increases. For example, a card having many optical connectors can experience significant force to the extent that the card deforms or is forced out of its slot by the mating force of the optical connectors thereon.

The connector of the present invention does not require such high mating forces. Since the fiber preferably protrudes from the ferrule, there is no need to deform the ferrule to effect physical contact between the fiber end face and the mating component. Therefore, the mating force of the connector of the present invention is less than that required to deform the ferrule therein. The present invention thus offers advantages over polished ferrules not only with respect to simplifying the preparation of a terminated connector, but also with respect to improving the performance of physical contact ferrule connectors.

Yet another advantage offered by the present invention over conventional polished ferrules is the fact that the mating face of the ferrule and the end face of the fiber are not interdependent. That is, unlike a conventional polished ferrule, the end face of the fiber can be shaped for particular application without shaping the mating face of the ferrule in a similar fashion. This allows the end face of the fiber to be shaped to enhance optical performance (for example, angled to reduce back reflection), while the mating face of the ferrule remains unpolished and essentially normal to the fiber for easy handling and alignment.

This advantage is particularly significant with respect to non-physical contacting optical coupling. Specifically, in certain non-physical contacting optical coupling applications, such as expanded beam connectors, which use a ball lens to optically couple connectors, the ferrule must be precisely positioned within a ferrule holder such that the focal point of the fiber is precisely located relative to the ferrule holder. Precisely positioning the focal point is critical to ensure that light is effectively coupled to and from the fiber. This positioning is typically accomplished by registering a particular surface of the ferrule on a surface of the ferrule holder. In a preferred embodiment, this registration is accomplished by the leading edge of the ferrule "seating" on a register surface or shoulder within the ferrule holder.

Although this configuration is adequate for multimode applications in which the ferrule's mating face is polished normal to the fiber, it tends to be unsuitable for conventional single mode applications in which the ferrule's mating face is polished at an angle. Angled polished ferrules are used in single mode applications to reduce back reflection as mentioned above. Angled polished ferrules, however, are asymmetrical—that is, since they are polished at approximately an 8° angle, their leading edge is actually a point along the periphery of the mating face. This asymmetrical aspect of the ferrule makes it difficult for the ferrule to "seat" precisely on a shoulder in a ferrule holder since only the point of the ferrule contacts the shoulder. Although the shoulder could be asymmetrical itself to receive the angled ferrule, such a ferrule holder would be difficult to manufacture and cost prohibitive. Aggravating the imprecision of seating the point of an angled polished ferrule on the shoulder of the ferrule holder is the fact that the point tends to be sharp, especially in small form factor applications, and, consequently, tends to either dig into the shoulder or deform As the ferrule digs into the shoulder or deforms, the focal point of the fiber relative to the ferrule holder changes, thereby adversely affecting the coupling efficiency of the connector.

Figure 6:
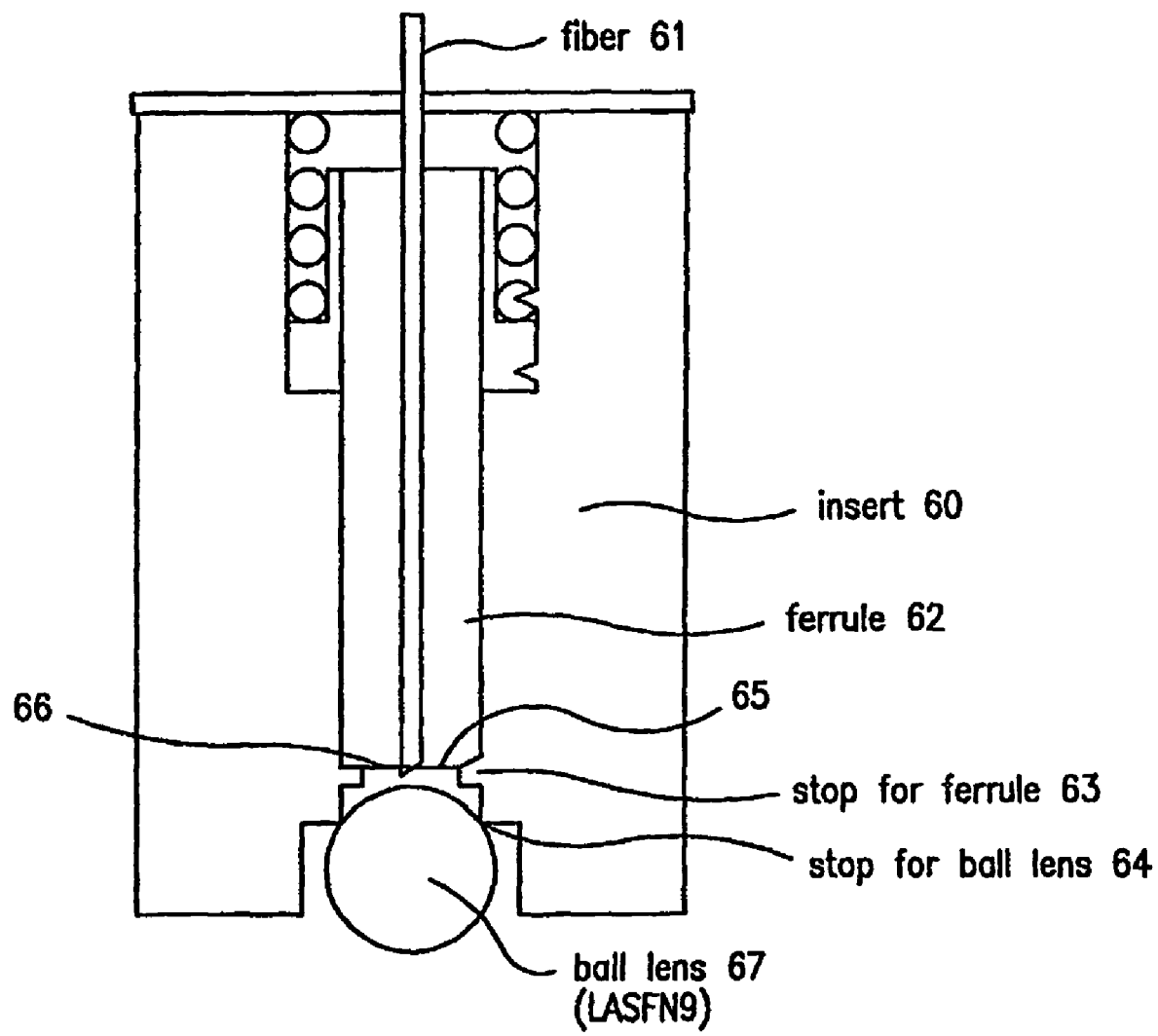
FIG. 6 shows an insert of an expanded beam connector in which the end face of the fiber is angled to reduce back reflection.

In accordance with the present invention, this problem is avoided by providing a ferrule assembly in which the fiber has an angled end face, but the ferrule has a normal mating face for easy handling and packaging. For example, referring to FIG. 6, an insert 60 of expanded been connector is shown. The insert 60 contains a ferrule 62 which in turn contains a fiber 61. The ferrule 62 is precisely positioned within the insert 60 by virtue of a stop 63. More specifically, the stop 63 provides a reference surface for the mating face 64 of the ferrule 62 to of expanded been connector is shown. The insert 60 contains a ferrule 62 which in turn contains a fiber 61. The fiber 61 comprises an angled end face 66 which is optically coupled with a ball lens 67. The ferrule 62 is precisely positioned within the insert 60 by virtue of a stop 63. More specifically, the stop 63 provides a reference surface for the mating face 64 of the ferrule 62 to butt up against. Those of skill the art will appreciate that, if the ferrule is precisely positioned with respect to the insert 60, the focal point of the fiber 61 will also be precisely positioned relative to the insert. In contrast to a conventional angled polished ferrule, the ferrule 63 shown in FIG. 6 as a mating face 64 normal to the fiber axis. Consequently, the entire perimeter of the mating surface 64 contacts the stop 63 rather than just a single point along the perimeter. This provides for more reliable seating, especially since the entire perimeter of the mating surface is unlikely to dig into the stop 63 (as a point would) and thereby result in the focal point of fiber 61 moving relative to the insert 60.

In addition to expanded beam connector applications, the preterminated fiber configuration of the present invention also lends itself to a number of other non-physical contacting applications in which the focal point of the fiber must be controlled precisely by seating the ferrule precisely. Such applications include, for example, optical couplings with active devices, such as VCSEL lasers, and passive devices, such as filters.

It should be apparent from the above description that the ferrule assembly of the present invention provides for significant advantages over conventional polished ferrule configuration such as lower cost and simplicity in manufacturing and enhanced versatility with respect to the type of mating components with which it can effect optically coupling. Still other advantages of the ferrule assembly are anticipated.

What is claimed is:

1. A process for preparing a ferrule assembly for physical contact optical coupling, said process comprising:
   (a) positioning at least one fiber having an end portion in a ferrule having an unpolished mating face such that said end portion extends beyond said unpolished mating face of said ferrule;
   (b) after step (a), cleaving said end portion of said fiber;
   (c) after step (b), affixing said fiber relative to said ferrule;
   (d) after steps (b) and (c), assembling said ferrule assembly into an optical package; and
   (e) optically coupling said ferrule assembly with an optical path of a mating component via physical contact without polishing said unpolished mating face and said fiber.

2. The process of claim 1, wherein step (c) is performed using laser cleaving.

3. The process of claim 2, wherein step (b) is performed before step (c).

4. The process of claim 1, wherein said mating face comprises a reflective material.

5. The process of claim 4, wherein said reflective surface comprises copper.

6. A connector comprising the ferrule assembly of claim 1.

7. The connector of claim 6, wherein said connector establishes physical contact with a mating connector having a polished ferrule.

8. The connector of claim 7, wherein said mating connector has an undercut fiber.

9. The connector of claim 6, wherein said connector establishing physical contact with a mating connector having an unpolished ferrule.

10. The connector of claim 6, wherein said ferrule assembly is biased forward with a force less than that required to deform said ferrule.

11. A process for preparing a ferrule assembly for physical contact optical coupling, said process comprising:
   (a) positioning at least one fiber having an end portion in a ferrule having an unpolished mating face such that said end portion extends beyond said unpolished mating face of said ferrule;
   (b) after step (a), affixing said fiber relative to said ferrule;
   (c) after step (a), laser cleaving said end portion of said fiber using a combination of a laser and a convergent lens, said combination produces beam having an angle of convergence of $\beta$ from the centerline of said beam and wherein said beam impinges on said portion at an angle $\alpha$ from the normal plane of said fiber and at a distance $d_o$ from said end face of said ferrule, wherein $d_o$ is about 0;
   (d) after steps (b) and (c), assembling said ferrule assembly into an optical package; and
   (e) optically coupling said ferrule assembly with an optical path of a mating component via physical contact without polishing said unpolished mating face and said fiber.

12. The process of claim 11, wherein said ferrule has a shaped mating face having angle $\phi$ from the normal plane of said fiber, and wherein $\phi\alpha+\beta$.

13. The process of claim 11, wherein $\alpha>\beta$.

14. The process of claim 11, wherein said beam impinges the fiber at an angle $\theta$ from the normal plane of the fiber and wherein angles $\theta$ and $\alpha$ are measured perpendicular to each other.

15. The process of claim 14, wherein $\theta>0$.

16. The process of claim 14, wherein $\theta$ is about 7.

17. The process of claim 14, wherein $\theta$ is about 0.

18. A process for preparing terminated fibers comprising:
   (a) positioning at least one fiber in a ferrule such that a portion of said fiber extends beyond the mating face of the ferrule;
   (b) after step (a), cleaving said portion of said fiber;
   (c) after step (b), moving said fiber backward relative to said ferrule such that said fiber protrudes from the mating face by a distance $d_f$; and
   (d) after step (c), affixing said fiber relative to said ferrule.

19. The process of claim 18, wherein after (b) said fiber protrudes a distance $d_o$ from said end face of said ferrule, wherein $d_o>0.3$ mm.

20. The process of claim 18, wherein moving said fiber backward relative to said ferrule comprises pressing said end face with said fiber protruding therefrom against a surface to thereby push said fiber backward relative to said ferrule.

21. The process of claim 20, wherein $d_f=0$.

22. The process of claim 20, wherein said end face is pushed against said surface at an angle such that said mating face is not flush with said surface, thereby $d_f>0$.

23. The process of claim 18, wherein $d_f>0$.

* * * * *